A. W. NELSON.
AUTOMOBILE RIM LUG AND WEDGE.
APPLICATION FILED FEB. 27, 1920.
1,425,677.                                        Patented Aug. 15, 1922.
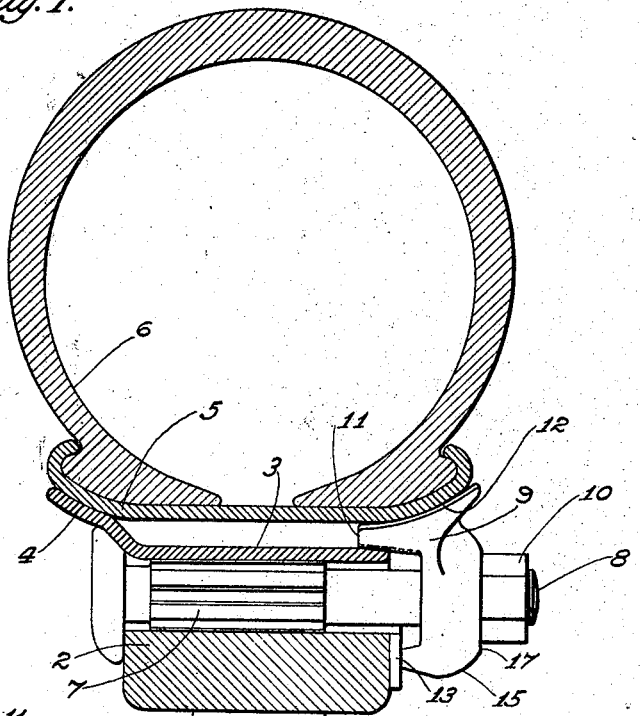
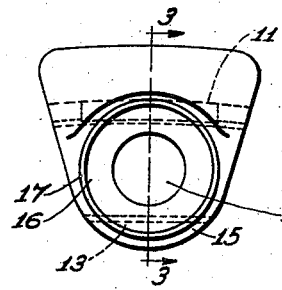
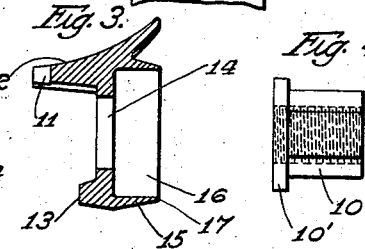
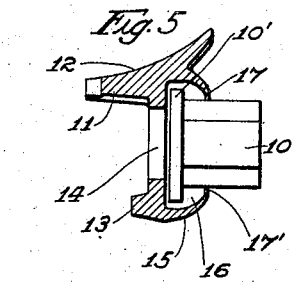
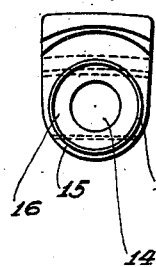
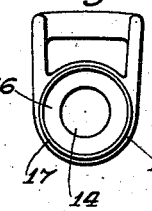
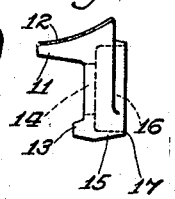
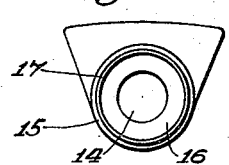
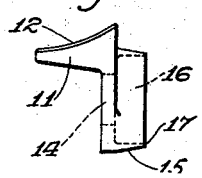
Inventor
Arthur W. Nelson

UNITED STATES PATENT OFFICE.

ARTHUR WM. NELSON, OF CHICAGO, ILLINOIS, ASSIGNOR TO STONE THOMPSON MANUFACTURING COMPANY, OF CHICAGO, ILLINOIS, A CORPORATION OF ILLINOIS.

AUTOMOBILE RIM LUG AND WEDGE.

1,425,677. Specification of Letters Patent. Patented Aug. 15, 1922.

Application filed February 27, 1920. Serial No. 361,763.

*To all whom it may concern:*

Be it known that I, ARTHUR WM. NELSON, a citizen of the United States, and a resident of Chicago, county of Cook, and State of Illinois, have invented certain new and useful Improvements in Automobile Rim Lugs and Wedges, of which the following is a specification.

My invention relates generally to improvements in lugs and wedges for demountable rims, as used extensively on automobile wheels; and relates particularly to lugs and wedges for use with demountable rims which by movement axially of the wheel are wedged, or pressed into place.

In constructions of the above character, it is common practice to provide a bolt which extends through the felly axially of the wheel and which is provided with a threaded end. For co-action with the threaded end a nut is provided which co-acts with the lug or wedge in moving it axially thereon. In some lug and wedge constructions the nut is a part separate from the lug or wedge. This feature is one which, in practise, is unsatisfactory because of the likelihood of losing the relatively small nut. Another objection resides in the multiplicity of parts which thereby become necessary. In some wedge and lug constructions, the nut and lug or wedge have been secured together; but in all constructions with which I am familiar, a third part is employed for the purpose of securing the nut and lug or wedge together in such manner that they may move together when the nut is screwed on or off the bolt, at the same time being sufficiently free to permit relative rotative movement of the nut and lug or wedge. While it is desirable that the nut and wedge or lug shall have certain freedom of movement, still it is very desirable that the nut be entirely surrounded so that it may function properly and at the same time be of pleasing form.

My object is to provide a lug or wedge construction, and a method of producing same which shall result in uniting the nut and wedge or lug, as the case may be, in such manner that they shall move together; so that no additional parts shall be necessary, and so that the completed construction shall be admirably adapted to the purpose intended.

I aim also to produce a construction which can be made in a cheap, simple and expeditious manner.

My invention consists, generally, in a wedge or lug construction, and in a method of producing the same, whereby the above named objects, together with others that will appear hereinafter, are attainable; and my invention will be more readily understood by reference to the accompanying drawings, which illustrate the preferred embodiment thereof.

In said drawings:

Fig. 1 is a transverse sectional view through the felly of the wheel equipped with a demountable rim and tire and wedged in place by a device embodying my invention.

Fig. 2, is a face view of a wedge lug, embodying my invention, in the course of manufacture.

Fig. 3 is a sectional view very substantially on the line 3—3 of Fig. 2.

Fig. 4 is a view illustrating a flanged nut.

Fig. 5 is a view partially in section and partially in elevation illustrating the assembled wedge lug and operating nut.

Fig. 6, is a face view of a clamp; and

Fig. 7 is an edge view thereof, same being in that state of manufacture indicated with respect to the wedge lug in Fig. 2.

Figs. 8 and 9 are, respectively, face and edge views of a different form of clamp embodying my invention; and Figs. 10, and 11, and 12 and 13, show respectively a face view and an edge view of different forms of wedge lugs embodying my invention.

Referring particularly to Fig. 1 of the drawings, 2, represents a wheel felly on the outer periphery of which is mounted a felly band 3, which is provided with a conical flange 4 on one side. This forms a seat for the demountable rim 5 containing the pneumatic tire 6. The demountable rim 5 is pressed against the flange 4 and is held in place there by a wedge lug or clamp depending upon the form of the demountable rim. In the form shown in Fig. 1, the rim engaging member is a wedge lug while in other constructions a clamp, will be used. In any event the demountable rim must be prevented from moving axially outward of the wheel. This is accomplished by providing a nut and bolt construction for moving the wedge lug or clamp with great force against the demountable rim. 7 represents a bolt which is transversely mounted in the wheel felly and the outer end 8 of which is threaded. 9 represents the wedge lug and 10 the nut for operating same, the nut 10 being internally threaded for co-action with the threads of the bolt. As will be described shortly, the connection between the wedge lug 9 and the nut 10 permits rotation of the nut while the wedge lug simply moves longitudinally of the bolt depending upon the direction of rotation of the nut 10. Having now described generally, the construction of the rim with which my device is used, I shall describe the method of producing same which will be best understood by reference to Figs. 2 to 5, inclusive.

The wedge lug comprises a tapering tongue portion 11 adapted to enter the space between the felly and the demountable rim, and the seat portion 12 for engagement with the demountable rim. The size, shape and disposition of these parts will be determined by the size, shape, and character of the rim construction with which it is used. The lower part of the wedge lug is provided with a slight projection 13 which in practise bears against a plate carried by the felly. Centrally of the wedge lug I provide an opening 14 for the accommodation of the bolt 7. Concentrically spaced, with respect to the axis of the opening 14, I provide an annular outwardly projecting wall or flange portion 15 thereby defining an interior opening 16. The flange or wall 15 is tapered so that the outer portion 17 thereof presents a thin or feather-like edge. The nut 10 is provided with a flange 10′ at one end and in the assembling of the wedge lug and nut, the flange 10′ is placed in the opening 16 and thereafter the edge portion 17 of the flange 15 is formed inwardly, as shown in Fig. 5, thereby reducing the opening 17′ to such an extent as to prevent passage of the flange 10′ therethrough. I make the wedge lug of a good grade of malleable iron and, as before stated, bring the wall 15 down to a feather edge which thereby enables me to form it inwardly an extent sufficient entirely to prevent withdrawal of the nut 10. At the same time the space 16 is such as to provide for certain freedom of movement between the parts which will permit of the free relative rotation of the nut and lug and also permit the nut to adjust itself to variations in the angular positions of the bolts as they are met with in practise.

By making the wedge lug of a good grade of malleable iron and forming the feather edge inwardly and completely around its circumference, it is possible to close the cap sufficiently without the use of any extraneous, or intermediate parts. It will also be obvious that the assembling and closing operations may be easily performed.

Figs. 6 and 7 and Figs. 8 and 9 show different forms of rim clamping members and differ from that form of my invention already described in that they are formed merely to press against the demountable rim or rim engaging parts instead of wedging into place. It is not thought necessary to describe them in detail but for the purpose of identification I have marked the portions which co-operate in holding the nut in place with the same reference characters as have been applied to Figs. 2 and 3.

Figs. 10, 11, 12 and 13 illustrate wedge lugs of a slightly different form in so far as the wedging parts are concerned, but, inasmuch as those parts formed to co-operate with the nut are concerned they are of like construction, and have been given similar reference characters.

It will be noted that in Figs. 6 to 13, inclusive, the parts are shown as in the process of manufacture, i. e. being in that stage before the annular flange or wall 15 is formed inwardly to trap the flange of the nut in the opening 16. This operation, it will be understood, is or may be carried out as described with respect to Figs. 2 to 5, inclusive.

The forms of wedge lugs and clamps shown should be considered as by way of illustration and not by way of limitation. In the claims for a broad term to cover any form of device whether it be a wedge lug or a clamping member, I shall use the term "holding member" which shall be construed broadly to mean a wedge, clamp or analogous device.

I claim:

1. A demountable rim holding device embodying therein a member formed to provide an opening for the accommodation of a bolt, an annular tapering flange projecting from the body of the device and being annularly reduced at its edge thereby defining an opening smaller in size than the opening defined by the remainder of the flange, a nut having a flange of a size greater than the opening defined by said reduced flange portion and positioned between the wall defining said bolt opening and said inturned flange.

2. A demountable rim holding device embodying therein a member formed to provide an opening for the accommodation of a bolt, an annular flange of gradual reduced thickness toward its outer edge projecting from the body of the device and being annularly reduced at its edge, thereby defining an opening smaller in size than the opening defined by the remainder of the flange, a nut having a flange of a size greater than the opening defined by said reduced flange portion and positioned between the wall defining said bolt opening and said inturned flange.

In testimony whereof, I have hereunto set my hand, this 23rd day of February, 1920.

ARTHUR WM. NELSON.